United States Patent
Döttling et al.

(10) Patent No.: US 7,310,109 B2
(45) Date of Patent: Dec. 18, 2007

(54) PROTECTIVE DEVICE FOR SAFEGUARDING A HAZARDOUS AREA AND METHOD OF CHECKING THE FUNCTIONAL RELIABILITY OF SUCH A DEVICE

(75) Inventors: Dietmar Döttling, Leinfelden-Echterdingen (DE); Oliver Fuchs, Esslingen (DE); Mathias Sälzer, Reichenbach (DE); Martin Wendler, Stuttgart (DE); Christoph Weishaar, Weinstadt (DE)

(73) Assignee: Pilz GmbH & Co., Ostfildern (DE)

( * ) Notice: Subject to any disclaimer, the term of this patent is extended or adjusted under 35 U.S.C. 154(b) by 807 days.

(21) Appl. No.: 10/265,338

(22) Filed: Oct. 4, 2002

(65) Prior Publication Data
US 2003/0030723 A1 Feb. 13, 2003

Related U.S. Application Data

(63) Continuation of application No. PCT/EP01/03180, filed on Mar. 20, 2001.

(30) Foreign Application Priority Data
Apr. 7, 2000 (DE) .................... 100 17 333
Apr. 7, 2000 (DE) .................... 100 17 344

(51) Int. Cl.
H04N 7/18 (2006.01)
H04N 5/225 (2006.01)

(52) U.S. Cl. ............ 348/82; 348/218.1; 348/187

(58) Field of Classification Search ............ 348/218.1, 348/76, 142, 175, 176, 187, 188, 82, 370, 348/83, 373, 68; 382/100, 153; 702/116; 700/258, 259; 356/614, 388, 394, 398; 600/104, 600/109
See application file for complete search history.

(56) References Cited

U.S. PATENT DOCUMENTS
4,491,868 A * 1/1985 Berridge et al. ............ 348/187
(Continued)

FOREIGN PATENT DOCUMENTS
DE 41 02 196 A1 8/1991
(Continued)

OTHER PUBLICATIONS
Patent Abstract of Japan; Publication No. 10262174; dated Sep. 29, 1998; Applicant: Kotaki Kiroaki; Title: Solid-State Image Pickup Device.

*Primary Examiner*—Victor R. Kostak
(74) *Attorney, Agent, or Firm*—Harness, Dickey & Pierce, P.L.C.

(57) ABSTRACT

The present invention discloses a protective device for safeguarding a hazardous area and a method for checking the functional reliability of such a device. The protective device has an image recording unit with an image sensor which includes a large number of light-sensitive pixels. During operation, the image recording unit records an object image. The image sensor is also supplied with a defined test image in order to check the functional reliability, wherein the test image recorded by the image sensor is compared with a defined expectation. According to one aspect of the invention, the object image is specifically made dynamic by means of a testing device and the modified object image is used as the test image.

13 Claims, 9 Drawing Sheets

U.S. PATENT DOCUMENTS

| | | | |
|---|---|---|---|
| 4,639,591 A | | 1/1987 | Barry |
| 4,727,179 A | * | 2/1988 | Schmalfuss .................. 348/83 |
| 4,761,685 A | * | 8/1988 | Asaida et al. ............... 348/188 |
| 4,991,007 A | | 2/1991 | Corley |
| 5,142,359 A | * | 8/1992 | Yamamori .................. 348/70 |
| 5,444,481 A | | 8/1995 | Oshima et al. |
| 5,506,912 A | | 4/1996 | Magasaki et al. |
| 5,510,772 A | * | 4/1996 | Lasenby .................... 340/578 |
| 5,544,338 A | * | 8/1996 | Forslund .................... 711/217 |
| 5,742,403 A | * | 4/1998 | Compton et al. ........... 358/406 |
| 5,805,218 A | * | 9/1998 | Ohura et al. ................ 348/353 |
| 5,850,352 A | * | 12/1998 | Moezzi et al. .............. 345/419 |
| 5,878,151 A | * | 3/1999 | Tang et al. ................. 382/103 |
| 6,437,823 B1 | * | 8/2002 | Zhang ....................... 348/187 |
| 6,734,849 B2 | * | 5/2004 | Dimsdale et al. ........... 345/419 |

FOREIGN PATENT DOCUMENTS

| | | |
|---|---|---|
| DE | 44 36 306 C1 | 11/1995 |
| DE | 295 20 980 U1 | 8/1996 |
| EP | 0 366 136 A1 | 5/1990 |
| EP | 0 485 274 A2 | 5/1992 |
| EP | 0 494 308 A1 | 7/1992 |
| EP | 0 902 402 A2 | 9/1998 |
| EP | 0 902 402 B1 | 3/1999 |
| JP | 10-262174 | 9/1998 |

* cited by examiner

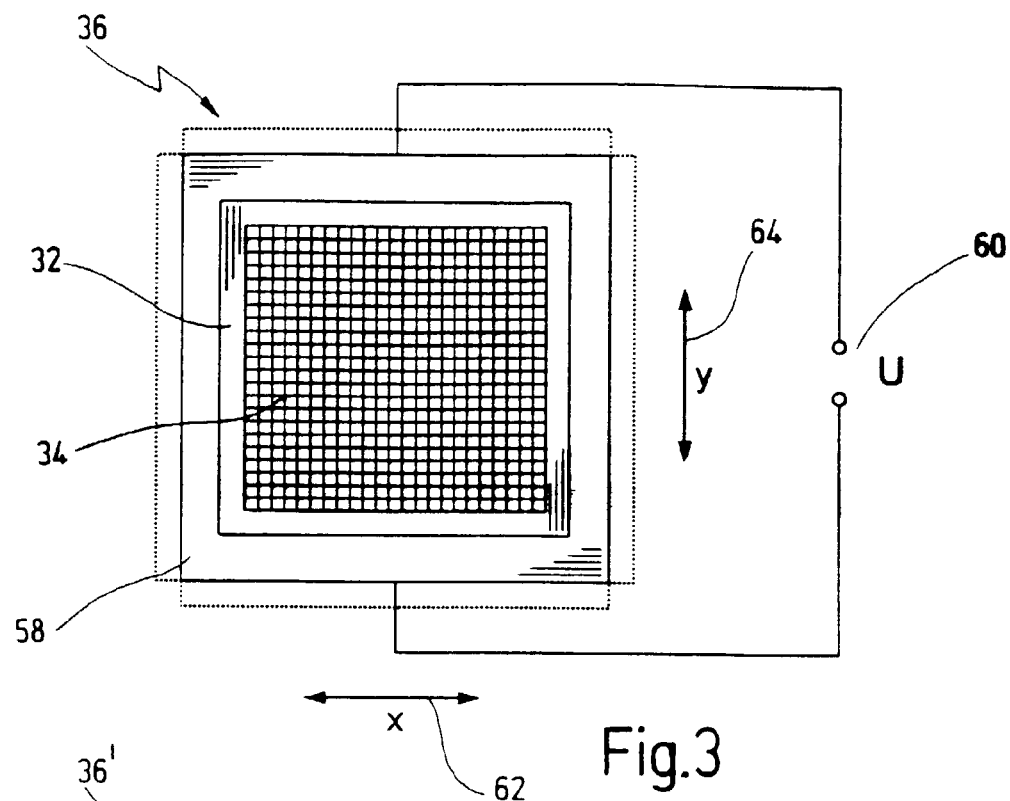
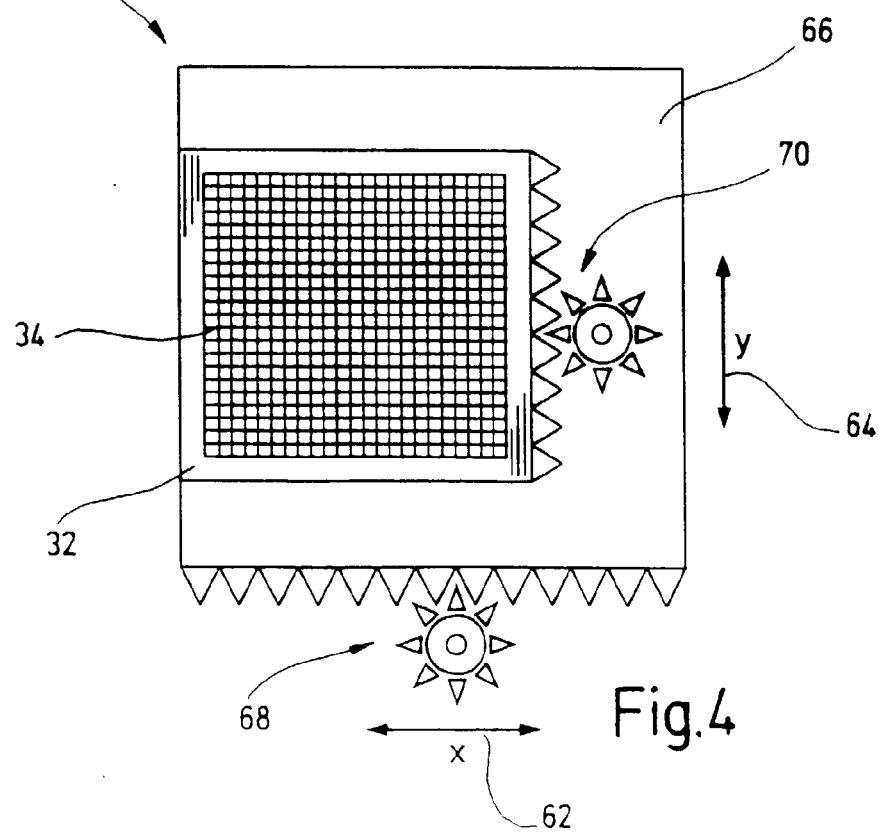

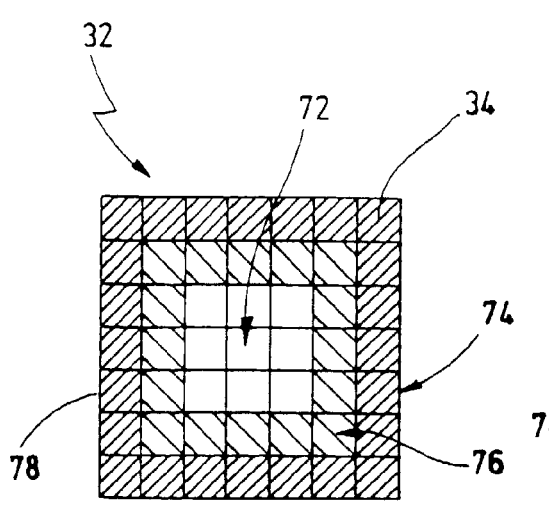
Fig.5
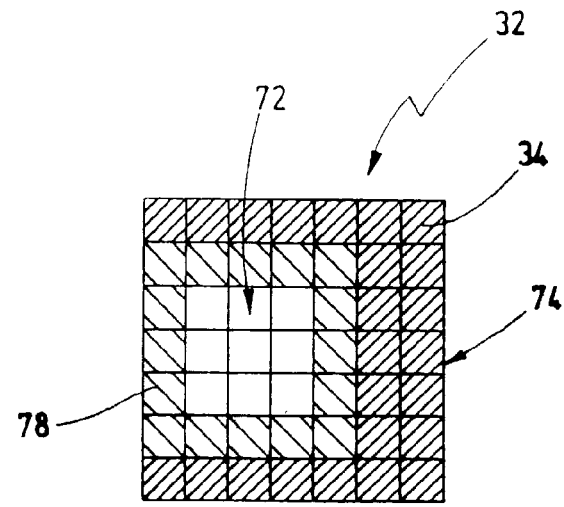
Fig.6
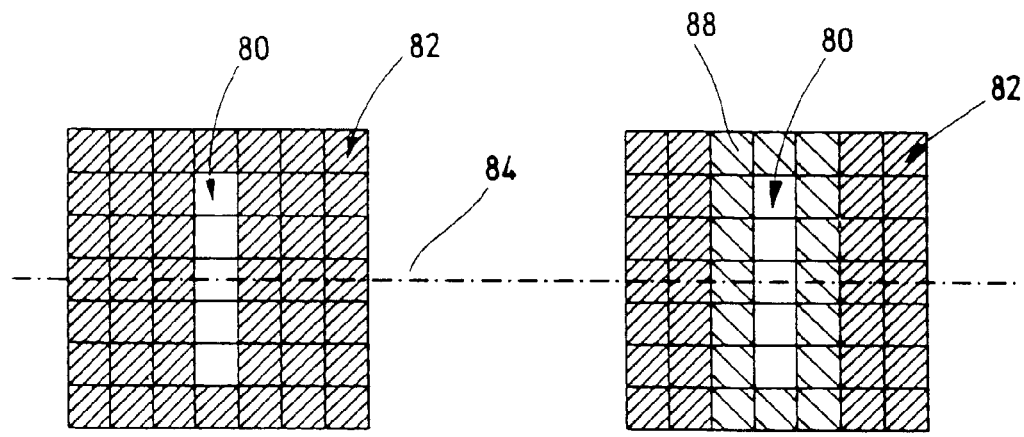
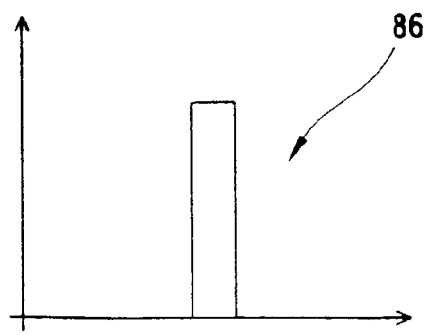
Fig.7
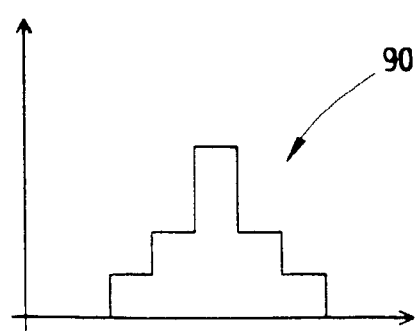
Fig.8

US 7,310,109 B2

PROTECTIVE DEVICE FOR SAFEGUARDING A HAZARDOUS AREA AND METHOD OF CHECKING THE FUNCTIONAL RELIABILITY OF SUCH A DEVICE

CROSS-REFERENCES TO RELATED APPLICATIONS

This application is a continuation of international patent application PCT/EP01/03180 filed on Mar. 20, 2001 designating the U.S. and published as WO 01/78411 A1 in German language, which international patent application claims priority from German patent applications DE 100 17 333.0 and DE 100 17 344.6, both of which filed on Apr. 7, 2000.

BACKGROUND OF THE INVENTION

The present invention relates to a protective device for safeguarding a hazardous area, such as the hazardous area of an automatically operating machine. The invention particularly relates to a device having an image recording unit for recording an object image, which unit includes an image sensor having a plurality of light-sensitive pixels, an evaluation and control unit which triggers a safety function responsive to the recorded object image, and a testing device for checking the functional reliability of at least the image recording unit.

The invention moreover relates to a method of checking the functional reliability or proper function of an image sensor which includes a large number of light-sensitive pixels, the image sensor recording an object image during operation. A defined test image is supplied to the image sensor for checking the functional reliability, and the test image recorded by the image sensor is compared with a defined expectation.

EP 0 902 402 A2 discloses a protective device designated as monitoring system, which device comprises at least one digital camera having a camera module, an A/D converter, and also an evaluation unit with a microprocessor and an image memory. In the evaluation unit, gray values from a currently recorded object image are compared pixel by pixel with gray values of a reference image. On the basis of this comparison, the protective device is capable to detect whether there is a dangerous foreign object in the monitored area. In response thereto, the closing of the doors of an elevator is prevented then.

Since failure of the protective device due to a fault can result in a situation which is dangerous to humans or material values, the known protective device monitors the functional reliability of the camera. Various methods are proposed for this purpose, namely checking for the presence of a synchronization signal from the camera, checking absolute and/or relative values of the lightness, periodically feeding in a test image to a video multiplexer input of the camera and specifically blinding the camera by means of a light-emitting diode, the image pattern recorded by the camera in this case being compared with a reference pattern.

By means of these methods, it is basically possible to carry out simple checking of the protective device for functional reliability. However, the aforementioned methods are not sufficient, in the form disclosed, to satisfy the requirements of higher safety categories of European Standard EN 954-1, in particular the requirements of categories 3 and 4. For example, by monitoring a synchronization signal in the camera, it is not possible to determine whether individual pixels of the image sensor used in the camera are faulty. Feeding in test images and blinding the camera by means of a light-emitting diode possess, by contrast, the disadvantage that the protective device is "blind" during the time of the functional check. Safeguarding a hazardous area without time gaps is therefore not possible.

SUMMARY OF THE INVENTION

It is an object of the present invention to specify a device of the type mentioned at the beginning which allows for safeguarding of a hazardous area in a manner which is fail-safe and has no time gaps.

It is another object of the invention to specify a method which allows a fail-safe checking of the functional reliability of such a device, and in particular of an image sensor used in such a device, without time gaps.

In the case of the protective device cited at the beginning, this object is achieved by the testing device comprising a modifier for specifically modifying an object image supplied to the image sensor.

In the case of the method cited at the beginning, the object is achieved by the object image specifically being modified by means of a modifier, and by the modified object image being used as the test image.

In contrast to the known methods, an object image recorded during normal operation of the protective device is used as test image for checking the functional reliability according to one aspect of the present invention. The object image is varied in a specific manner by means of preferred measures which are described below in further detail. This positive or enforced modification (other words: variation, manipulation) is carried out in a deterministic way, i.e. on the basis of dependencies which can be determined. Due to the known dependencies, the modified object image should correspond to a known or at least determinable expectation in the event of a device operating without faults. Otherwise, there is a fault in the device. The expectation can be stored, for example, in the form of a reference image in a memory. However, as an alternative to this, it can also be derived by computation from the respective modification of the object image.

As will be explained with reference to the following preferred configurations of the invention, the original image information of the object image can be maintained without being destroyed, so that the protective device is not blind even during the functional check. As a result, safeguarding of the hazardous area is possible without any time gaps.

Moreover, the invention has the advantage that the entire signal path of the object image can implicitly be tested by the comparison. As a result, in the same test run, not only faults in or on the image sensor of the image recording unit but, furthermore, faults in other components of the signal path, for example an A/D converter, can be detected. Furthermore, checking can take place on the real object image. As opposed to the prior art, no artificial test scenario differing from the actual observation task is generated. This ensures that the image recording unit is checked precisely with regard to the observation task assigned to it. By contrast, in the case of previously known methods, there is, at least in principle, the risk that a fault occurring during real operation is not recognized under "laboratory conditions" with an artificial test image. The method of the invention therefore has a higher fail-safety with regard to the actual use of the image recording unit.

In a preferred refinement of the protective device according to the invention, the testing device comprises means for making the object image supplied to the image sensor dynamic in relation to specifically defined pixels. Accordingly, the object image in the method according to the invention is preferably made dynamic in relation to specifically defined pixels.

Due to these measures, it is particularly possible to check the image sensor of the image recording unit specifically for individual faults. Possible faults of the image sensor are primarily so-called stuck-at errors in individual pixels, where the respective pixel no longer changes its output signal, irrespective of the object image recorded. Another source of faults are static or dynamic coupling between individual pixels, which can occur both individually and also in clusters or lines or columns. In this case, the output signal from a pixel is erroneously influenced by another pixel. Furthermore, addressing errors can occur, i.e. the image information of a first pixel is erroneously read out, although a second, different pixel has been addressed by the evaluation unit. Finally, faults can occur because individual pixels can be changed in terms of their information content by external influences, such as UV radiation or electrical interference.

In the preferred configuration of the invention, each of these conceivable faults can be detected very reliably and in real time. This is particularly advantageous in view of the requirements of the higher safety categories of the European Standard EN 954-1.

In a further configuration, the testing device comprises means for making the object image supplied to the image sensor dynamic in relation to individual pixels.

This measure has the advantage that the previously explained faults can be determined individually for each individual pixel. As a result, very flexible fault checking is possible, which can be adapted relatively simply to changing requirements.

In a further configuration of the invention, the testing device comprises a modifier which displaces the image sensor and the object image relative to each other. Accordingly, the image sensor and the object image are displaced relative to each other in this configuration.

Due to this measure, it is easy possible to specifically make dynamic (to vary) an object image recorded during operation of the protective device, and with regard to defined pixels. Here, this measure has the advantage that the object image, in spite of being made dynamic, is retained substantially unchanged, which simplifies the subsequent image evaluation. The functional reliability of the protective device can therefore be checked with comparatively few modifications in the normal data processing of the object image.

In a further configuration of the aforementioned measure, the image sensor is displaced in terms of its physical position by means of the testing device.

Preferably, the image sensor is displaced transversely with respect to an optical axis of the image recording unit in this case.

This measure has the advantage that the recording optics of the image recording unit can be rigid which, firstly, simplifies their construction and, secondly, permits a high imaging quality and light intensity. During a displacement transversely with respect to the optical axis, in particular along the focal plane of the recording optics, the sharpness of the object image is, furthermore, substantially maintained, which again simplifies its evaluation.

In another configuration of the invention, the image recording unit comprises recording optics having an optical path for the object image, and the optical path is varied by means of the testing device. In preferred configurations, the recording optics are displaced in relation to the image sensor and/or a rotating optical element is arranged in the optical path of the recording optics.

By varying the optical path for the object image, it is also possible to displace the image sensor and the object image in relation to each other. In this case, large displacements can be achieved with relatively small movement excursions. Furthermore, in this configuration of the invention, the image sensor can remain fixed in its physical position. High flexibility with respect to the construction and technical implementation of the protective device according to the invention is therefore achieved. All the last-named, basically alternative configurations can also advantageously be combined with one another.

In a further configuration of the invention, the image sensor and the object image are displaced pixel by pixel in relation to each other.

This measure again has the advantage that faults which occur in the image sensor can be determined with regard to individual pixels. As a result, using a protective device of this configuration, the requirements of safety categories 3 and 4 of the European Standard already mentioned can be met particularly well.

In a further configuration of the invention, the object image comprises a defined pattern with light and dark areas.

This measure has the advantage that the object image, because of the high inherent contrast, provides possibilities of effecting gray-value changes in individual pixels as a result of the displacement. These determined gray-value changes are particularly suitable for checking the functional reliability of the respective pixel in a reliable manner.

In a further configuration of the invention, the testing device comprises a light source in order to superimpose a variable optical signal on the object image. Accordingly, in the method according to this configuration the invention, a variable optical signal is superimposed on the object image.

The optical signal can be both an optical signal generated additionally and a global variation of the available total illumination. This measure has the advantage that modifying the object image is carried out without intervening in the optical signal path. It is therefore possible to optimize the imaging properties of the image recording unit independently of the testing device. Furthermore, this readily makes it possible to retrofit the method according to the invention even to earlier protective devices of the generic type. Finally, a further advantage is that modifying the object image in the object plane, i.e. in the area of the recorded object, is possible. In this case, the functional reliability of the protective device can be checked at the system level without selecting and evaluating individual pixels in the image sensor being required.

In a further configuration of the aforementioned measure, the light source is a laser light source.

This measure has the advantage that specific modification of individual pixels of the image sensor is possible. This is again of particular advantage with regard to achieving safety categories 3 or 4.

In a further configuration of the invention, the light source illuminates an object area.

This measure has the advantage already mentioned, namely that the protective device can be checked at the system level without individual components of the protective device having to be tested on their own. As a result, the entire protective device can be checked very quickly for its functional reliability.

In an alternative configuration of the aforementioned measure, the light source illuminates the image sensor.

This measure is particularly advantageous when the object area observed does not contain any suitable objects or obstacles which can be illuminated by the light source. As a result, in this configuration of the invention, adaptation of the object area, which may be complicated under certain circumstances, may be dispensed with.

In a further configuration of the invention, the protective device comprises scanning optics which supply the object image to the image sensor in chronologically successive subsections. The method according to this configuration of the invention is characterized by the object image being supplied to the image sensor in chronologically successive subsections.

This measure has the advantage that the object image is already dynamic as a result of the system. Additional modification can therefore be dispensed with in this configuration of the invention.

In a further configuration of the aforementioned measure, the image sensor has a line-like arrangement of pixels.

This measure has the advantage that the number of pixels required and, consequently, also the number of possible error sources is reduced. Added to this is the fact that a pixel in the case of a line-like arrangement has only two immediately adjacent pixels by which its output signal could be influenced. By this means, too, the number of possible errors is reduced. The method according to the invention therefore becomes simpler and quicker.

In a further configuration of the aforementioned measures, the protective device comprises a physically extended cooperative target, whose course is arranged at an angle to a scanning device of the scanning optics.

A cooperative target in this sense is a contrasting structure that differs from the surrounding background and can easily be identified by the evaluation unit of the protective device. An oblique course of this structure in relation to the scanning device leads to a very simple and therefore cost-effective way for effective modification of the object image recorded, since the position of the structure in the scanned object image moves step by step over the image sensor.

In a further configuration, the testing device makes the object image dynamic by means of a first and a second manipulation, the first and the second manipulation being different from each other and having a defined relationship to each other.

Here, the reference image is likewise generated by means of a manipulation (modification) of the object image. The two manipulations are different from each other, but have a fixed relationship to each other. Consequently, and as a result of the identical starting basis, namely the object image recorded, the test image and the expectation (reference image) can specifically be compared with each other. In the event of fault-free operation of the image sensor, the test image and the expectation must be identical or at least correspond within the scope of the defined relationship. Due to the fact that the two manipulations of the object image are different from each other, any functional disruptions of the image sensor during the generation of the test image and the generation of the reference image have different effects, so that the error which occurs can be detected by means of the comparison of the two images.

In a preferred configuration of the invention, during the first manipulation, an optical path of the object image is varied physically.

In this configuration of the invention, the object image is varied on its path to the image sensor without measures or events being required in the observed object area itself. The manipulation can therefore be carried out physically in the area of the image sensor. As a result, the device according to the invention can be accommodated compactly in a unit containing the image sensor. This simplifies the installation and, in addition, makes more difficult or prevents a deliberate or inadvertent deactivation or falsification of the functional check. Furthermore, in this case the image sensor obtains a real but specifically modified object image, so that the entire signal path from the front optics to the image processing unit of the system can be checked in this configuration of the invention. Furthermore, the method according to this configuration of the invention is independent of the actual technical implementation of the camera system which contains the image sensor to be checked.

In a further configuration of the aforementioned measure, the optical path of the object image is varied by introducing an optical element.

Introducing an optical element into the optical path of the object image constitutes a technically simple way of performing the first manipulation. In addition, by means of various optical elements, alternatively or in combination with one another, various first manipulations can be produced, in order to specifically check various properties of the image sensor or of the image recording unit in this way. In addition, an optical element has the advantage that its physical properties, which effect the change in the optical path, are robust with respect to external environmental influences or aging processes. As a result, the device of this configuration of the invention is particularly robust.

In a further configuration, the optical path of the object image is varied by varying an optical element.

The variation can be produced, for example, by adjusting an aperture. Another example is to arrange a rotating optical element in the optical path of the object image, the rotation effecting the aforementioned variation. The measure has the advantage that mechanical movement for inserting and removing the optical element into and from the optical path can be dispensed with, which simplifies the outlay on construction.

In this case, an aperture is quite generally the limiting part of an optical system. By means of the limitation, diffraction effects are caused in the edge region which have an effect in the image that is visible behind the aperture. In technical terms, an aperture acts like a physical low-pass filter and, in the area behind the aperture, widening of the object image occurs with an intensity distribution of approximately $\sin^2(x)/x$ shape. The use of an aperture has the advantage that the transfer function is exactly known as a function of the geometric dimensions, so that the defined relationship required for the comparison can be determined particularly simply.

In a further configuration of the aforementioned measures, the optical path is varied by means of a diffraction grating.

A diffraction grating is a grating-like structure which, in accordance with optical laws known per se, causes interference between the wave fronts which pass through, on the basis of diffraction effects. These interferences lead to a visible variation, which is therefore simple to evaluate, in the object image recorded. In addition, a diffraction grating has the advantage that the variations can be determined accurately on the basis of the geometric relationships and the wavelengths of the light beams. This makes it easier to compare the test image with the reference image.

In a further configuration of the aforementioned measure, the diffraction grating is activated electronically.

Introducing a diffraction grating into the optical path of the object image must not necessarily be carried out by means of a mechanical movement. Instead, the diffraction grating is preferably implemented by means of a transparent sheet in which electronically activated liquid crystals are arranged. The use of such liquid crystals is, for example, known from displays and monitors under the designation LCD (liquid crystal display). The measure has the advantage that the diffraction grating can be activated and deactivated very quickly. In addition, the constructional outlay which is required for a mechanical movement is dispensed with.

In a further configuration, during the second manipulation, image data from the object image is changed by computation by means of an image processing algorithm.

As an alternative to this, it is in principle possible to effect the second manipulation by means of a physical variation in the optical path as well. By contrast, the present measure has the advantage that it can be implemented very cost-effectively. In addition, manipulation of the object image by means of an image processing algorithm offers great flexibility, so that the method of the invention can be adapted very simply to changing requirements and/or functional tests. Finally, an implementation by means of an image processing algorithm is based on a technically completely different principle than a manipulation with physical means. Because of these different approaches, the probability that a fault occurred has an identical effect in both manipulations is reduced very sharply.

In a further configuration of the aforementioned measure, the image processing algorithm includes a computerized simulation of the first manipulation.

This measure has the advantage that the comparison between the reference image and the test image can be carried out particularly simply, since, in spite of the different manipulations, the two images must be identical if the image sensor or the image recording unit are functioning without faults overall. The measure is particularly advantageous when the computerized simulation of the first manipulation is exactly known, such as is the case in particular when a diffraction grating or an aperture is used.

It goes without saying that the features mentioned above and those still to be explained below can be used not only in the respectively specified combination but also in other combinations or on their own without departing from the scope of the present invention.

BRIEF DESCRIPTION OF THE DRAWINGS

Exemplary embodiments of the invention are illustrated in the drawing and will be explained in more detail in the following description. In the drawing:

FIG. 3 shows a first exemplary embodiment of a displaceable image sensor;

FIG. 4 shows a second exemplary embodiment of a displaceable image sensor;

FIG. 5 shows an image sensor with a schematically illustrated object image;

FIG. 6 shows the image sensor from FIG. 5 with a relatively displaced object image;

FIG. 7 shows an image sensor with a strip-like object image and a theoretical gray-value profile;

FIG. 8 shows the image sensor from FIG. 7 with an actual gray-value profile;

DETAILED DESCRIPTION OF PREFERRED EMBODIMENTS

Figure 1:
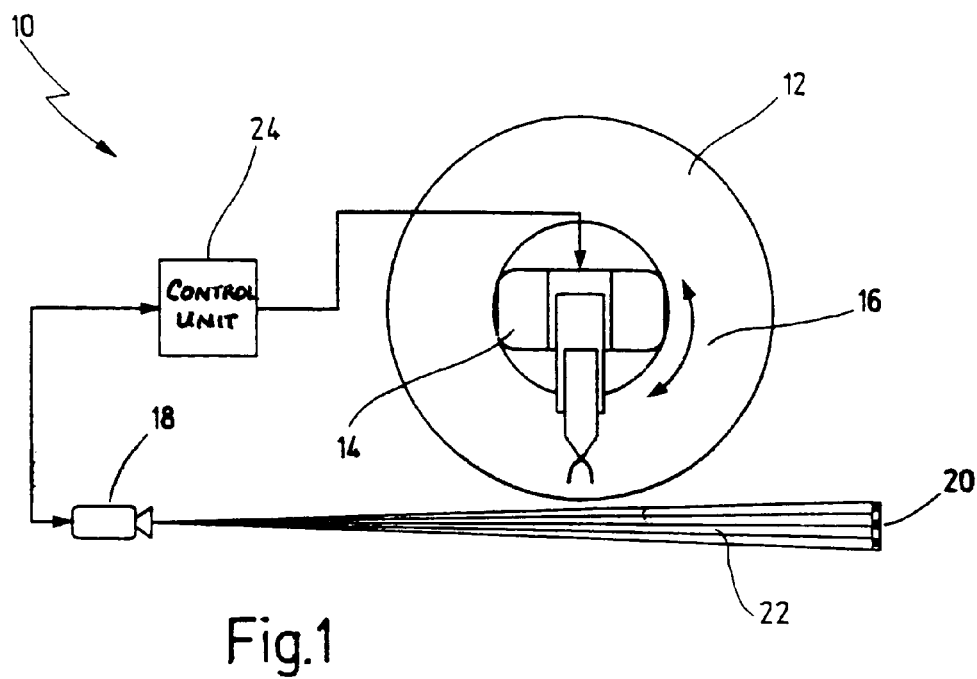
FIG. 1 shows a schematic plan view of a protective device according to the invention.

In FIG. 1, a protective device according to the invention is designated in its entirety by reference number 10.

The protective device 10 is used to safeguard a hazardous area 12 which results from the fact that an automatically operating machine 14 can move in the direction of arrow 16.

The reference number 18 designates an image recording unit, whose construction will be explained in more detail with reference to the following exemplary embodiments. The image recording unit 18 records the image of a cooperative target 20. It therefore forms a virtual barrier 22 which safeguards the hazardous area 12, since breaking through the virtual barrier 22 can easily be detected in front of the background of the cooperative target 20.

The image recording unit 18 is connected to an evaluation and control unit 24 which, when the virtual barrier 22 is broken through, triggers a safety function. The safety function includes, for example, the evaluation and control unit 24 switching off the machine 14 or otherwise putting it into a non-hazardous state.

Figure 2:
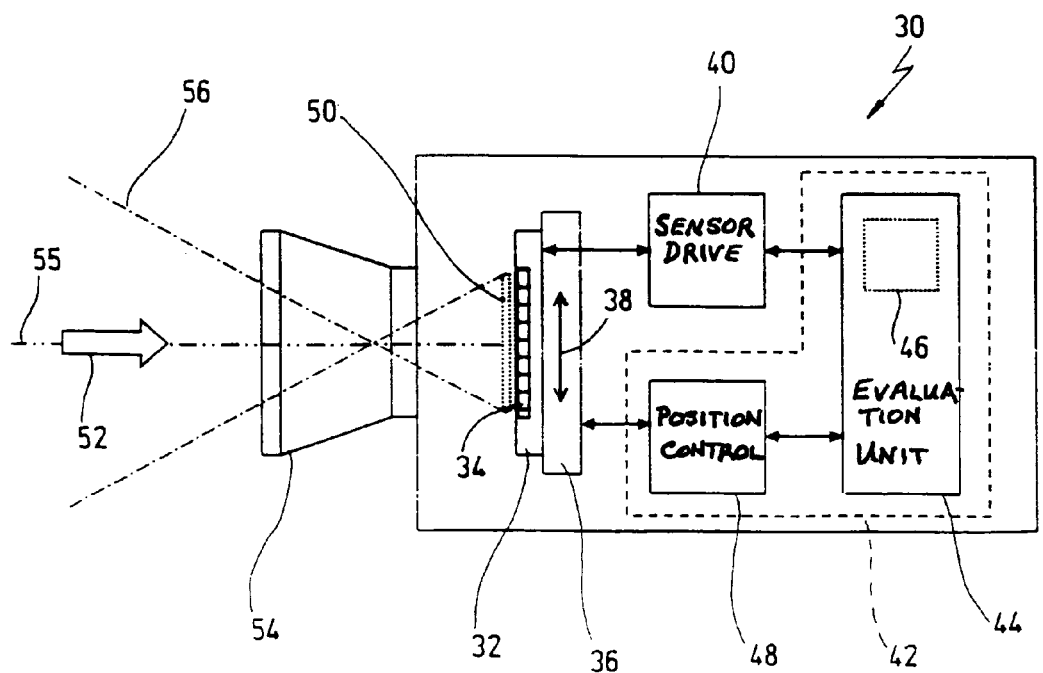
FIG. 2 shows the image recording unit of a protective device according to the invention, having a displaceable image sensor.

In FIG. 2, a first exemplary embodiment of an image recording unit for the protective device 10 is designated overall by reference number 30.

The image recording unit 30 has an image sensor 32 which includes a plurality of individual image points 34. The individual image points 34 are often referred to as pixels in technical language. Reference symbol 36 represents a positioning unit, on which the image sensor 32 is arranged. The positioning unit 36 can be moved in the direction of the arrow 38 and perpendicularly to the plane of the paper.

Reference number 40 designates a sensor drive system, which is preferably implemented by means of a so-called FPGA (field programmable gate array), or a digital signal processor. The sensor drive system 40 addresses, inter alia, the individual pixels 34 of the image sensor 32 and reads their image content out.

Reference number 42 designates a testing device for checking the functional reliability of the image recording unit 30 and, in particular, of the image sensor 32. The testing device 42 includes an evaluation unit 44, in which an expectation 46 is determined by computation and/or is stored in another suitable form. The expectation 46 includes expected values for the individual pixels, which a error-free image sensor 32 must supply during a check on its functional reliability.

According to a preferred exemplary embodiment, the evaluation unit 44 here also includes the function of the evaluation and control unit 24 from FIG. 1. However, this is not necessary for the implementation of the present invention.

The testing device 42 further includes a position control system 48, which determines the physical position of the image sensor 32 via positioning unit 36.

Reference number 50 designates an object image which is recorded by the image sensor 32 in the direction of arrow 52 (direction of incidence of the image) via recording optics 54. The recording optics have an optical axis which is designated by reference number 55. The optical path of the recording optics 54 is designated by reference number 56.

Exemplary embodiments of the positioning unit 36 are illustrated in FIGS. 3 and 4. Identical reference symbols designate the same elements as in the preceding figures.

In the exemplary embodiment according to FIG. 3, the positioning unit 36 includes a carrier 58 for the image sensor 32, said carrier consisting of a piezoelectric material. The carrier is connected to a voltage source 60. Depending on the respectively applied voltage U, the geometric dimensions of the carrier 58 change on account of the known piezoelectric effect, as a result of which the image sensor 32 is displaced in the direction of arrows 62, 64. Such a displacement of an image sensor 32 by means of a piezoelectric drive is known from another sector of image processing, namely the production of high-resolution cameras. A high-resolution camera based on this principle is described, for example, in a brochure from Jenoptik, 85386 Eching, Germany.

In the exemplary embodiment according to FIG. 4, the positioning unit is designated by reference number 36' in order to distinguish it from the preceding exemplary embodiment. The positioning unit 36' has a carrier 66 which can be moved in the direction of arrow 62 by means of a micromechanical drive 68. The image sensor 32 is in turn fixed on the carrier 66 such that it can be displaced, namely in the direction of the arrow 64 by a second micromechanical drive 70.

In both exemplary embodiments, the image sensor 32 can be displaced transversely with respect to the optical axis 55 and therefore transversely with respect to the direction of incidence 52 of the object image 50.

The effect of the relative displacement of the image sensor 32 and of the object image 50 can be seen in FIGS. 5 and 6. The object image 50 illustrated schematically here comprises a central brighter area 72 which is surrounded by a dark outer area 74. Reference number 46 designates a gray transition area located between these two areas. In accordance with these differently distributed image areas, the individual pixels 34 of the image sensor 32 record different image information.

In FIG. 5, the brighter area 72 is located centrally on the image sensor 32. By comparison, the brighter area 72 in FIG. 6 has been shifted to the left because of a displacement of the image sensor 32. The result of this is that, for example, the pixel 78 at the left-hand edge of the image sensor 32 receives a different, namely brighter, item of image information. If, then, the pixel 72 had a stuck-at error, for example, the evaluation unit 44 could detect this error on the basis of the expectation 46, since the pixel 78 in this case would remain at its erroneous, constant image content.

As can be understood from this, a relative displacement of the object image 50 and of the image sensor 32 pixel by pixel permits an individual functional check of the individual pixels 34. In the present case, an analog functional check of the individual pixels 34 is even possible, since the gray values in the transition area 76 represent an item of dedicated image information as compared with the brighter area 72 and the dark area 74.

A particular advantage of the method described here is that the modulation transfer function possessed by each recording optics 54 can implicitly be utilized. The modulation transfer function describes the changes in the object image 50 which are brought about on account of diffraction and the non-ideal transfer properties of the recording optics 54. As can be seen, the modulation transfer function is primarily manifested in a scatter, as a result of which a transition area 76 is always produced between the brighter area 72 and the dark area 74.

FIG. 7 shows by way of example the theoretical object image 50 from a cooperative target 20 which contains a bright white stripe 80 in front of a dark background 82. If the gray-value profile of this object image is recorded along line 84, a theoretical course corresponding to the graph 86 in FIG. 7 is obtained. In actual fact, on account of the modulation transfer function, an object image as illustrated by way of example in FIG. 8 results on the image sensor 32. The white stripe 80 "scatters" into the dark background 82, and a transition area 88 with an average brightness is produced. The course of the real gray-value profile along the line 84 is illustrated in the graph 90.

Figure 9:
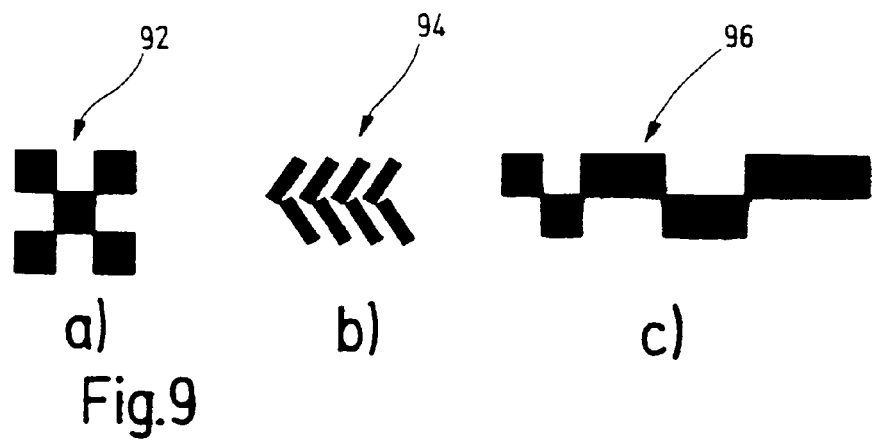
FIGS. 9a) to c) show exemplary embodiments of defined patterns with light and dark areas.

FIG. 9 shows various exemplary embodiments of patterns 92, 94, 96 having light and dark areas, which permit a particularly simple functional check of the individual pixels 34 of the image sensor 32 by means of displacement. By means of patterns of this type, all of the fault sources described at the beginning in individual pixels can easily be determined.

In the following description of further exemplary embodiments of the invention, same reference symbols continue to designate same elements as in the preceding figures.

Figure 10:
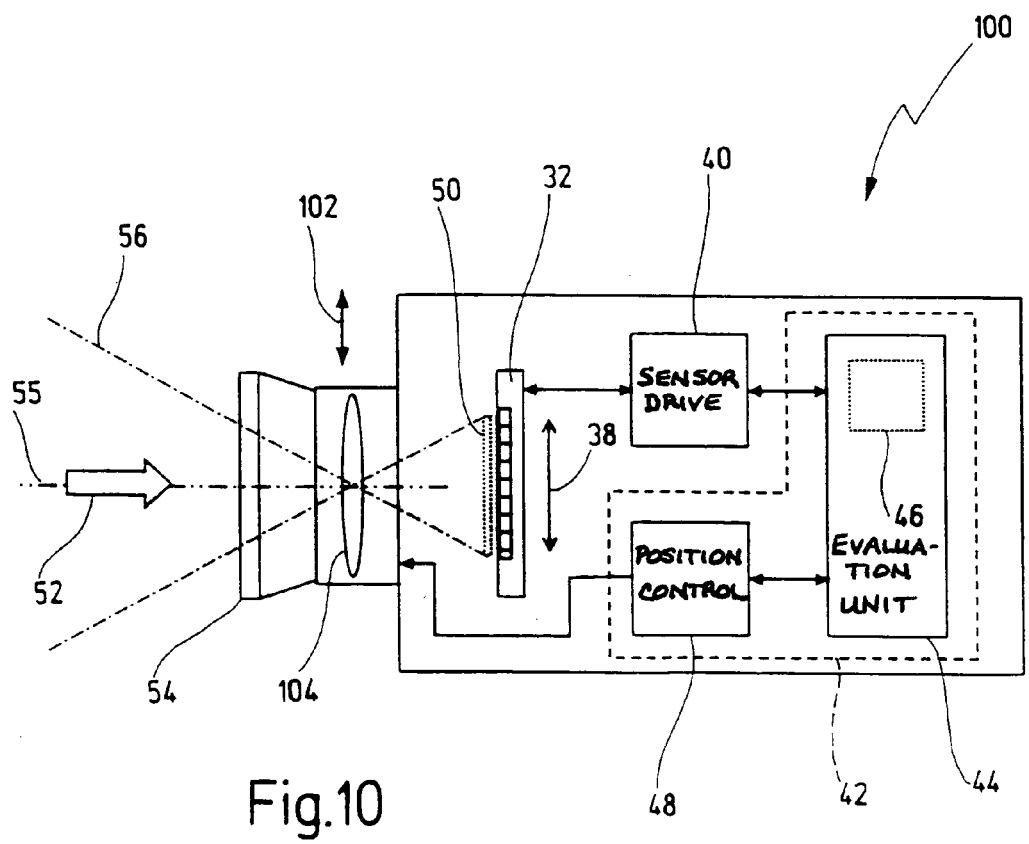
FIG. 10 shows an image recording unit having a testing device for varying the optical path for the object image.

In FIG. 10, a further exemplary embodiment of an image recording unit for the protective device 10 is designated in its entirety by the reference number 100.

The image recording unit 100 differs from the image recording unit 30 according to FIG. 2 substantially by the image sensor 32 being arranged to be stationary, while the object image 50 can be displaced relative thereto by varying the optical path 56. For this purpose, the image recording unit 100 has recording optics 54 which can be displaced in the direction of the arrow 102 and whose respective position is controlled via position control unit 48. Reference symbol 104 designates a lens included in the recording optics 54. Depending on the respective position of lens 104, the relative position of the object image 50 on the image sensor 32 is displaced.

In a further exemplary embodiment, not specifically illustrated here, the optical path 56 of the object image 50 is displaced electromechanically. This principle is known, for example, from an image recording unit from the Pixera Corp., Los Gatos, Calif., USA, which is marketed under the designation DiRactor™.

In further exemplary embodiments, the relative displacement of the object image is produced by means of a scanning mirror and/or a turning prism. Furthermore, enforced modification can be achieved by means of a rotating optical element in the optical path of the image recording unit. For example, a rotating prism in the optical path effects rotation of the entire object image on the image sensor. A rotating wedge plate, i.e. a transparent plate with a cross section that increases transversely with respect to the optical axis, effects a movement of each pixel on a defined circular path.

In these exemplary embodiments of the invention, a relative displacement of the object image 50 and of the image sensor 32 is also possible pixel by pixel, i.e. a displacement in steps of about 10 μm. The evaluation of a displaced object image and the functional checking of the image recording unit 100 is carried out here in accordance with the preceding description.

Figure 11:
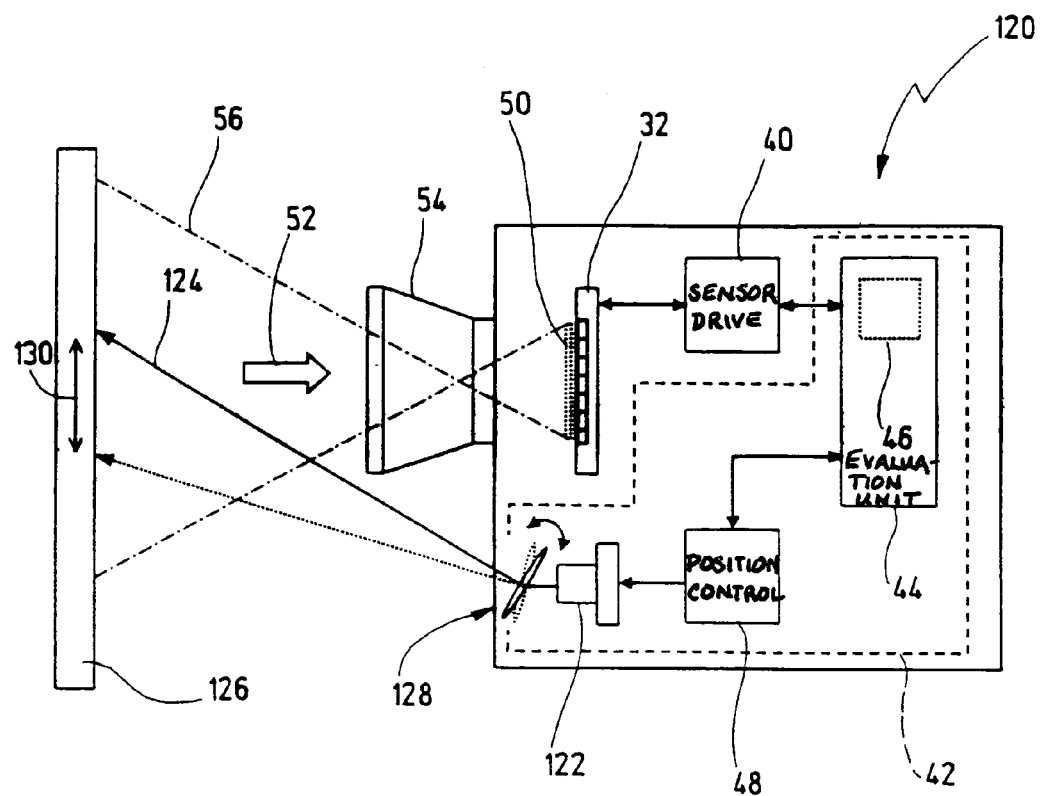
FIG. 11 shows an image recording unit having a testing device for superimposing an optical signal.

In FIG. 11, a further exemplary embodiment of an image recording unit for the protective device 10 is designated in its entirety by reference number 120.

As distinct from the preceding exemplary embodiments, the image recording unit 120 has a light source 122 in the form of a laser module. The optical signal 124 from the light source 122 illuminates an object 126 in the observation area of the image recording unit 120. The object 126 is preferably the cooperative target 20 according to FIG. 1.

The testing device 42 of the image recording unit 120 also has a diffraction unit 128, with which the optical signal 124 in the area of the object 126 can be positioned in the direction of the arrow 130 and at right angles to the plane of the paper. By means of the diffraction unit 128, it is therefore possible to illuminate any desired point in the area of the object 126 specifically.

Figure 12:
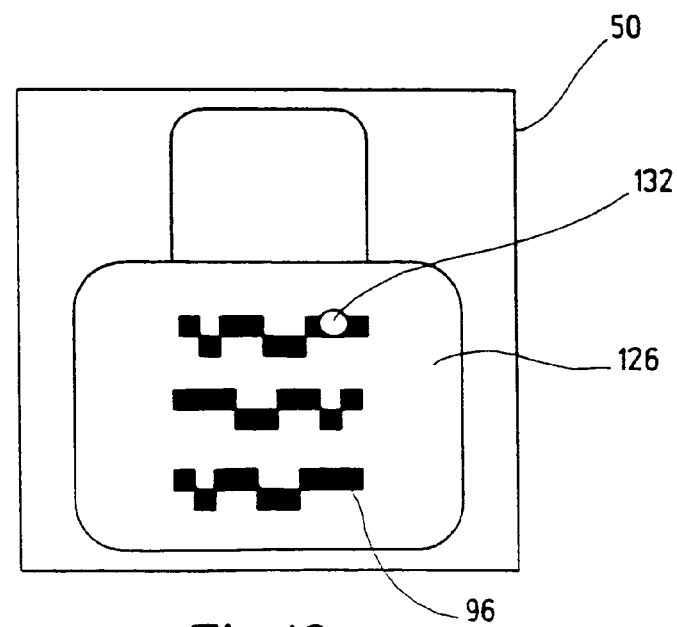
FIG. 12 shows an object image from the image recording unit from FIG. 11.

This is illustrated with reference to the example of an object image 50 in FIG. 12, in which the point of light from the optical signal 124 is designated by reference number 132. The image recording unit 120 records the object image 150 in the usual way and evaluates this in order to safeguard the hazardous area 12. Furthermore, the evaluation unit 44 determines the position of the point of light 132 in the recorded object image 50 and, by using the expectation 46, checks the function of the image sensor 72.

It goes without saying that, instead of a point of light 132, spots of light or specific light patterns can also be used.

Figure 13:
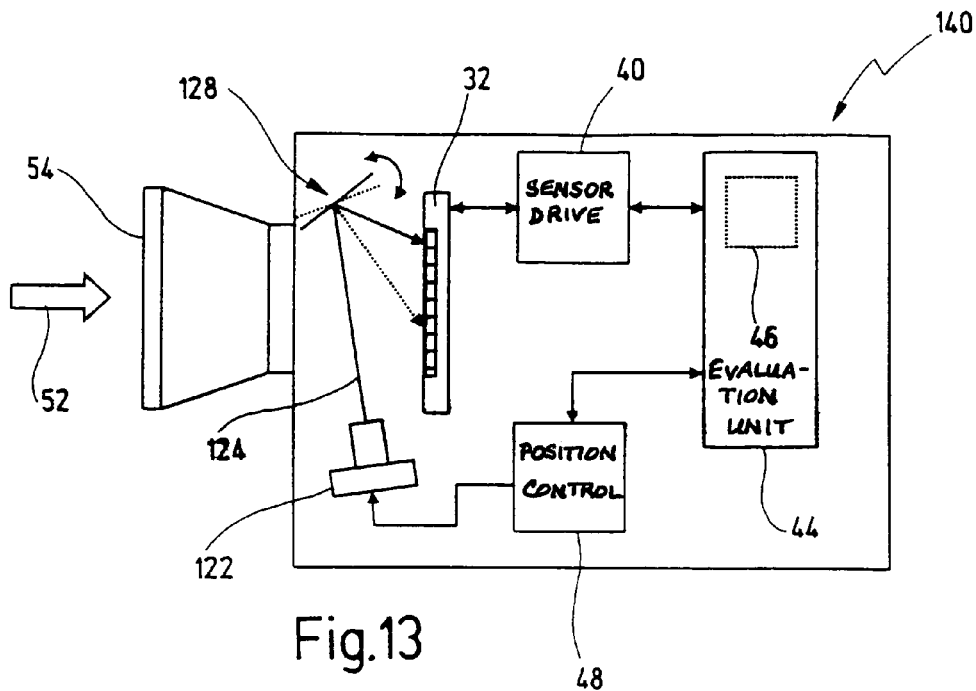
FIG. 13 shows a further image recording unit having a testing device for superimposing an optical signal.

In FIG. 13, a further exemplary embodiment of an image recording unit for the protective device 10 is designated in its entirety by reference number 140.

The image recording unit 140 differs from the preceding exemplary embodiment according to FIG. 11 substantially by the optical signal 124 from the light source 122 illuminating the image sensor 32 rather than the object area. Otherwise, the evaluation of the object image 50 and the method of checking the functional reliability corresponds to the preceding explanations.

In a further exemplary embodiment, enforced modification of the object image is produced by the lightness of the image being varied globally. This is likewise possible with an additional light source.

Figure 14:
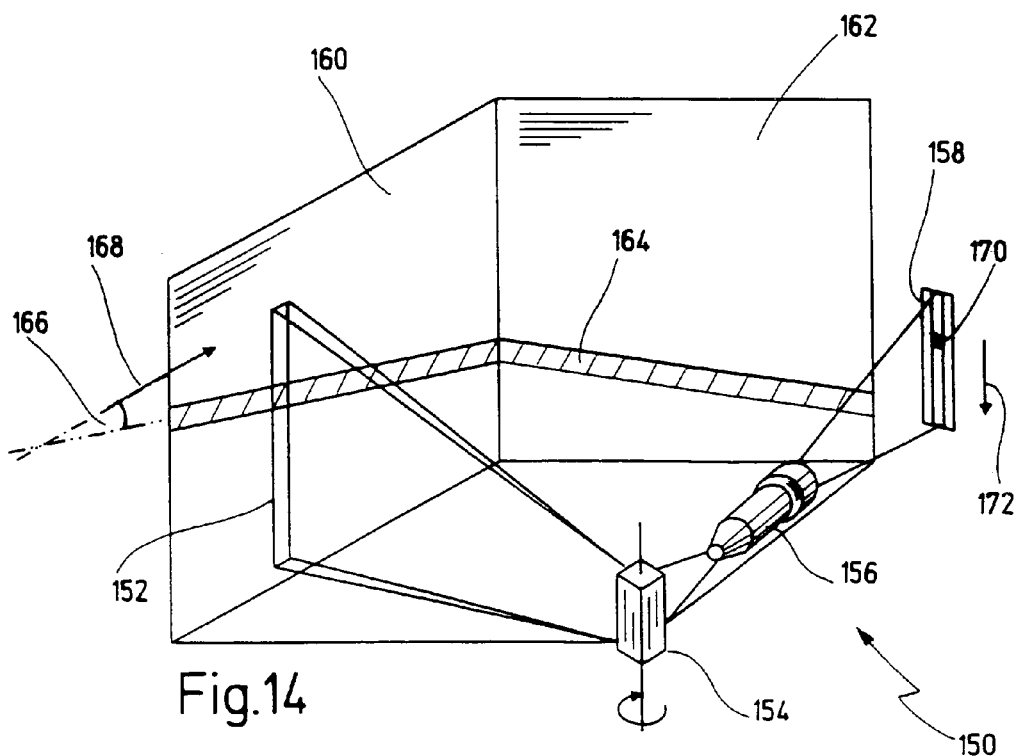
FIG. 14 shows a protective device according to the invention having scanning optics.

In the exemplary embodiment according to FIG. 14, the image recording unit, otherwise not specifically illustrated, has scanning optics 150, by means of which the object image 50 is supplied to the image sensor in chronologically successive subsections 152. The scanning optics 152 here include a rotatably mounted mirror 154, whose reflected image is recorded by means of a pinhole objective 156. The pinhole objective 156 focuses the recorded image of the subsection 152 on a row-like image sensor 158 which, in the present exemplary embodiment, comprises 1024×1 pixels.

The reference numbers 160 and 162 designate two walls arranged at an angle to each other, over whose inner surfaces there extends a structure 164 running obliquely. The structure 164 forms a cooperative target, by means of which a virtual barrier, lying horizontally in the present case, is produced. Here, the structure 164 runs at an angle 166 to the scanning direction 168 of the scanning optics 150. The result of this is that, in the successively recorded optic images of the subsections 152, the position of the structure 164 is different in each case. Clearly, the image 170 of the structure 164 moves in the direction of the arrow 172 over the row-like image sensor 158 as the scanning operation proceeds. Consequently, the result is enforced modification of the recorded object image, caused by the system. Since this enforced modification is determined on the basis of the physical arrangement, it can be used for checking the functional reliability of the protective device in the same way as described previously.

In this exemplary embodiment of the invention, the object image for the entire object area scanned is reassembled from the individual recorded subsections in an image memory (not illustrated here) included in the image recording unit, so that a complete image of the recorded object area results as an object image in this exemplary embodiment of the invention as well. The actual evaluation of the object image can therefore be carried out in the known way.

Figure 15:
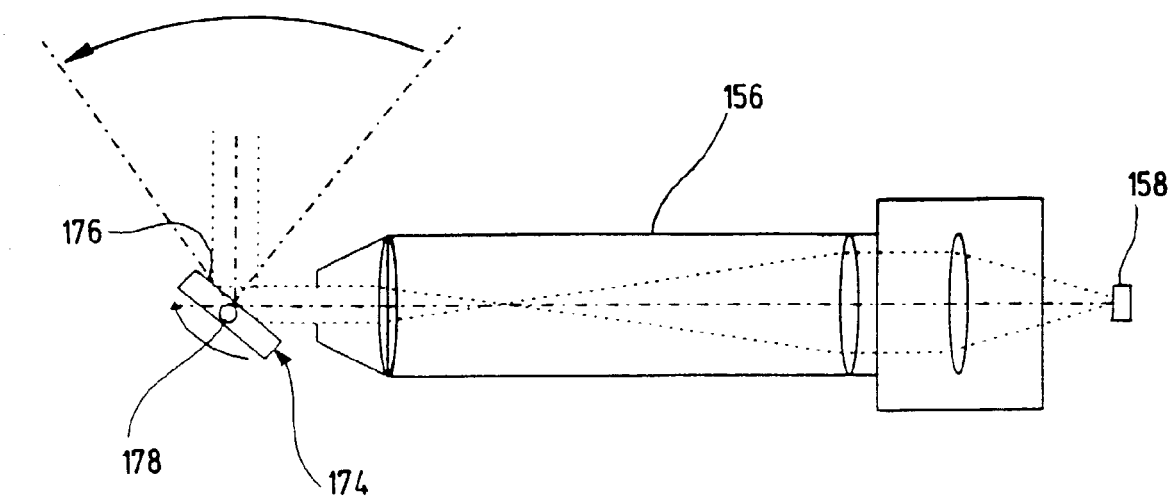
FIG. 15 shows the scanning optics of the protective device from FIG. 14.

In a further exemplary embodiment of this arrangement, which is illustrated in FIG. 15 only as an extract showing the pinhole objective 156 and the row sensor 158, the rotatable mirror 174 is silvered on its front side 176 and its rear side 178. Furthermore, the mirror 174 is inclined by about 1 to 2° to the vertical in its axis of rotation. An arrangement of this type results in a structure 164 running uniformly horizontally also being imaged dynamically onto the row sensor 158, specifically since the image of the structure 164 in this case jumps to and from alternately between two positions offset from each other.

According to a further exemplary embodiment, instead of or as an addition to a structure 164 running obliquely, the entire scanning optics 150 can also be inclined, preferably by about 10° to the horizontal. In this case, too, on account of the scanning, the result is automatic modification of the recorded object image.

Instead of a pinhole objective, a scanning objective or a telecentric objective can also be used in the exemplary embodiments previously described.

As an alternative or as an addition to the exemplary embodiments described hitherto, it is moreover possible to subject the image sensor 32 to an optical/electrical functional test similar to that which is known in the functional checking of semiconductor memories. In this case, the image sensor can be viewed as an optical, analog memory, into which image information is written optically. A functional check can be carried out, for example, by the image sensor being severely blinded in a manner known per se by means of a light source, in such a way that charge saturation is produced in all pixels. Individual pixels are then reset by means of a reset circuit in order to produce a desired test pattern. By means of suitable selection of this test pattern, it is possible to detect a plurality of faults during one test cycle. If, in addition, the light-emitting diode remains switched on during the test, a charge is built up again in the reset pixels, its magnitude depending on the integration time available. In this way, different gray values can be implemented in addition to the two maximum values.

According to a further exemplary embodiment on this principle, it is possible, instead of a reset function, to cover individual pixels specifically when blinding the image sensor, so that in this way an evaluable test pattern is produced. Covering individual pixels is preferably carried out by means of an LCD matrix which is arranged in front of the image sensor. Likewise, however, electronic shutters which are known per se can also be used for this purpose, provided that these permit individual pixels or clusters to be covered.

In all these methods of checking the functional reliability, it is necessary to discover faults which occur in individual pixels 34 of the image sensor 32, in order to achieve safety category 3 or 4 of the European Standard EN 954-1 with the entire protective device 10. Depending on the size of the image sensor used, different test patterns are possible in this case.

Figure 16:
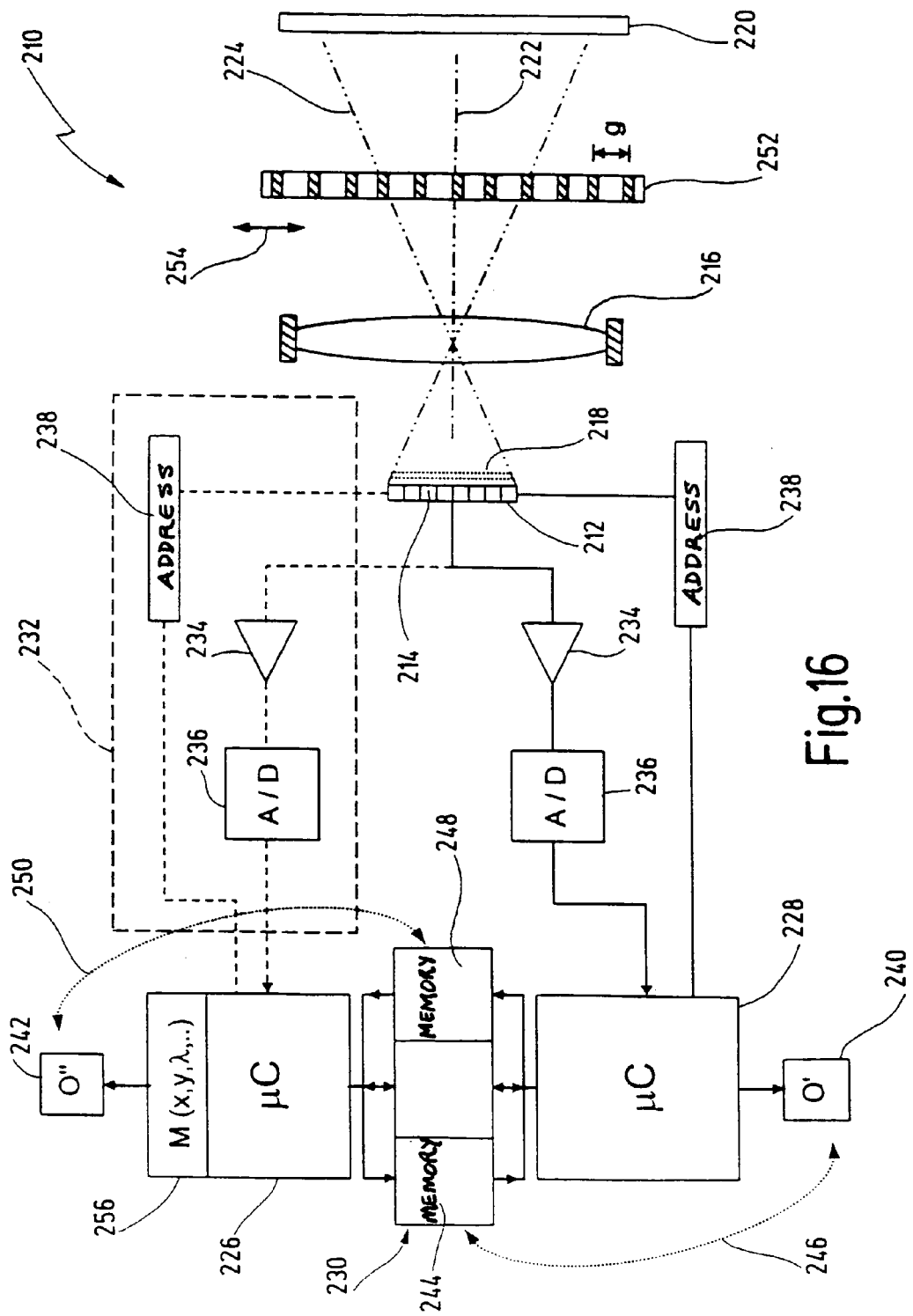
FIG. 16 shows a further image recording unit having a device according to the invention.

In FIG. 16, a further image recording unit having a device according to the invention is designated in its entirety by reference number 210.

The image recording unit 210 comprises an image sensor 212 having a plurality of pixels 214. The image sensor 212 records the object image 218 of an object 220 via recording optics 216. The object 220 is located in the observation area of the image recording unit 210. Reference symbol 222 designates the optical axis of the recording optics 216, and reference symbol 224 indicates the optical path for the object image 218 through the recording optics 216.

For reasons of fail-safety, the image recording unit 210 is of largely two-channel redundant construction, in each case a microcontroller 226, 228 being illustrated in FIG. 16 as representative for each of the two image processing channels. During the operation of the image recording unit 210, the two microcontrollers 226, 228 carry out image processing in a redundant manner with respect to each other, their results being used further in a subsequent circuit unit (not illustrated here). The results are preferably supplied to a subsequent evaluation and control unit which, on this basis, triggers a safety function, such as emergency shutdown of a machine that operates automatically.

In the present exemplary embodiment, the two microcontrollers 226, 228 are connected via a dual ported RAM 230, as it is known. This is a memory which can both be read and written by both microcontrollers 226, 228. Via the dual ported RAM 230, the two microcontrollers 226, 228 can exchange their respective processing results and compare them with each other. In this way, the two microcontrollers 226, 228 can monitor each other for error-free functioning during the operation of the image recording unit 210.

According to a preferred design of the invention, each of the two microcontrollers 226, 228 receives the image data from a recorded object image 218 via its own signal path. However, this is not absolutely necessary, for which reason the signal path 232 for the microcontroller 226 is illustrated by dashed lines in FIG. 16.

The two signal paths, of mutually redundant construction in the present exemplary embodiment, each have an amplifier 234, via which the image data from a recorded object image 218 is led to an analog-digital converter 236. There, the image data from the object image 218 is digitized and then supplied to the two microcontrollers 226, 228. For each signal path, the image sensor 212 is driven via its own addressing unit 238, which is controlled by the respectively associated microcontroller 226, 228. The components 234, 236, 238 of the two signal paths are illustrated as discrete here. However, as an alternative to this, they can also be integrated in a common circuit which, in a preferred design, additionally even contains the image sensor 212.

The reference symbols 240 and 242 in each case designate a memory. The memory 240 is assigned to the microcontroller 228 and is used to store a test image O', generated from the object image 218 by means of a first manipulation described below. The memory 242 is assigned to the microcontroller 226 and is used to store a reference image O", which is generated from the object image 218 by means of a second manipulation.

In the embodiment illustrated here, the dual ported RAM 230 has a first memory 244, in which the microcontroller 226 can store the reference image O", in order that the latter can be compared with the test image O' by the microcontroller 228. This comparison is indicated in FIG. 16 by the dotted arrow 246. Furthermore, the dual ported RAM 230 has a second memory area 248, in which the microcontroller 228 stores the test image O', in order that the microcontroller 226 can compare the latter with the reference image O". This comparison is indicated in FIG. 16 by the dotted arrow 250. On the basis of this preferred embodiment of the invention, a twofold, redundant comparison between the test image O' and the reference image O" therefore takes place.

In order to generate the test image O', the image recording unit 210 has an optical element 252 which can be introduced in the direction of the arrow 254 into the optical path 224 for the object image 218. In this exemplary embodiment, the optical element 252 is a diffraction grating, whose effect will be explained below by using FIGS. 17 and 18. In an alternative exemplary embodiment, the optical element 252, differing from FIG. 16, is an aperture, in particular an aperture with a variable opening. Furthermore, in order to perform the method according to the invention, any other desired optical elements can also be used whose influence on the object image 218 is known or at least can be determined sufficiently accurately. Furthermore, here the optical element 252 is introduced into the optical path 224 of the object image 218 on the object side. As an alternative to this, the optical element 252 can also be introduced into the optical path 224 of the object image 218 in the area of the image sensor 212, however, that is to say on the sensor side.

In order to generate the reference image O", the microcontroller 226 has an image processing unit 256 which contains an image processing algorithm M. According to the exemplary embodiment of the invention preferred here, the image processing algorithm M includes computational simulation of the first manipulation of the object image 218 using the diffraction grating 252. The computational simulation is indicated in FIG. 16 by using the modulation transfer function M (x, y, $\lambda$, . . . ), x and y designating the coordinates of the individual pixels of the image sensor 212 and $\lambda$ the wavelength of the incident light.

To generate the reference image O", the diffraction grating 252 is not located in the optical path 224. The object image 218 is therefore a substantially undistorted image of the object 220. The image data from the object image 218 recorded in this way is varied via the image processing algorithm in such a way that the effect of the diffraction grating 252 is simulated by computation. In the event of error-free functioning of the image recording unit 210, in particular of the image sensor 212, this computationally formed reference image O" must correspond to the test image O' produced by means of the diffraction grating 252. If this is not the case, there is a fault in the image sensor 212 and/or a fault in one of the signal paths or in the microcontrollers 226, 228.

Figure 17:
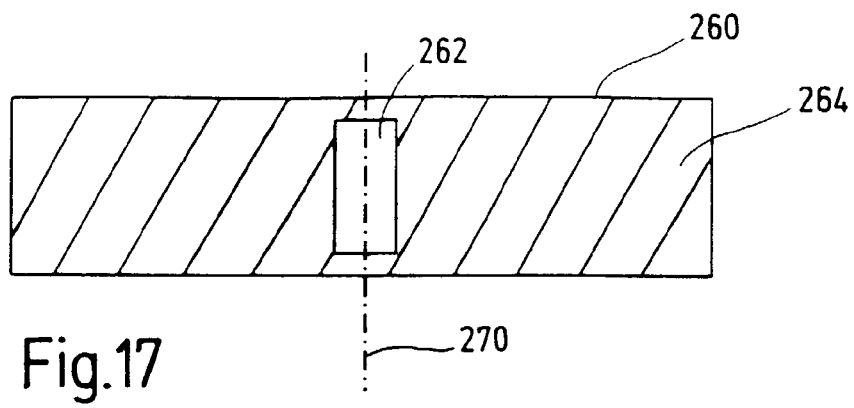
FIG. 17 shows a schematically illustrated object image.
Figure 18:
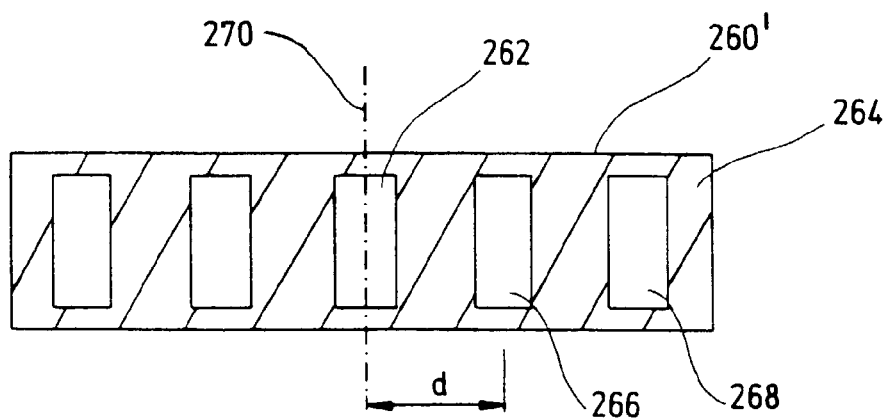
FIG. 18 shows a test image which is produced by a first manipulation from the object image according to FIG. 17.

FIGS. 17 and 18 show the effect of the diffraction grating 252 on the object image 218. In FIG. 17, an unchanged object image is designated by reference number 260. By way of example, the object image 260 here comprises a bright, bar-like area 262 which is surrounded by a darker area 264.

As a result of introducing the diffraction grating 252 into the optical path 224, interferences are generated, the result of which is that further brighter areas 266, 268 are formed at defined distances d on the right and left of the brighter area 262. The intensity of the further area 266, 268 is in this case lower than the intensity of the brighter area 262. For the angle at which the further brighter areas 266, 268 occur, based on the mid-axis 270, the following relationship applies:

$$\sin \alpha = n \cdot \lambda / g$$

where α is the deflection angle, λ the wavelength, n the order of the area considered and g the grating constant of the diffraction grating.

By using diffraction gratings with different grating constants g, it is therefore easily possible to generate different first manipulations of the object image 260.

Figure 19:
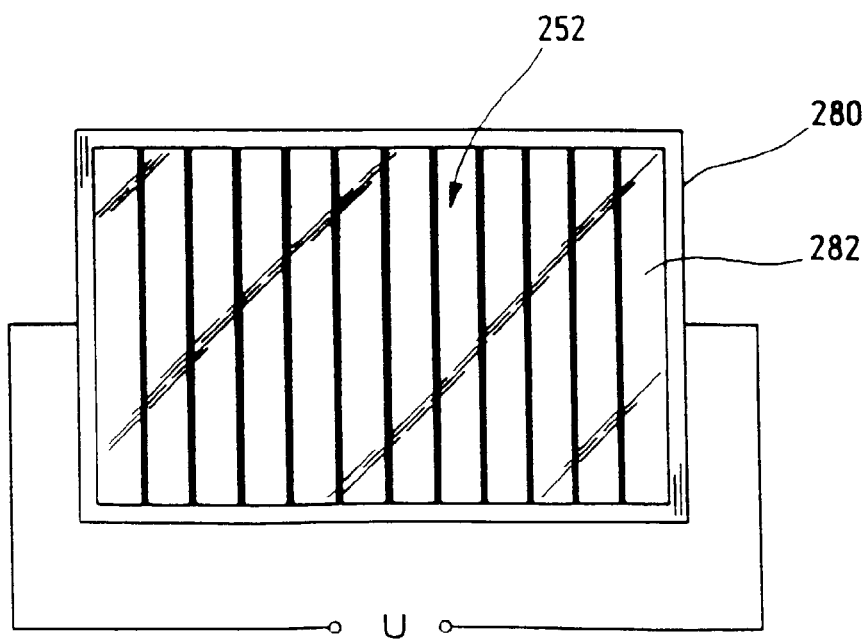
FIG. 19 shows an electronically activatable diffraction grating.

FIG. 19 shows a liquid crystal element 280 having a usually completely transparent area 282, in which individual liquid crystals can be activated, by applying a voltage U, in such a way that they form an only partially transparent diffraction grating 252. Here, by applying various control voltages U, diffraction gratings 252 having different grating constants g and/or different grating profiles can be produced. When the liquid crystal element 280 is used, therefore, mechanical movement for the insertion and removal of the diffraction grating 252 into the optical path 224 can be dispensed with.

In a further exemplary embodiment of the invention, the diffraction grating 252 rotates about the optical axis 222 of the image recording unit 210. In this way, a defined variation in the optical path 224 for the object image 218 is brought about. Because of its defined properties, this variation can again be simulated by computation by means of the second manipulation.

What is claimed is:

1. A protective device for safeguarding a hazardous area of a machine, said device having
    an image recording unit for recording an object image, said image recording unit including an image sensor having a plurality of light-sensitive pixels,
    an evaluation and control unit for triggering a safety function responsive to the recorded object image, said safety function putting the machine into a non-hazardous state, and
    a testing device for checking a functional reliability of at least said image recording unit,
    wherein said testing device comprises a comparator for comparing a defined expectation and a defined test image recorded by the image sensor,
    said testing device further comprising a modifier for modifying an object image supplied to the image sensor in a specific manner for generating a specifically modified object image, and
    said comparator using said specifically modified object image as said predefined test image.

2. The protective device of claim 1, wherein said modifier is adapted to modify said object image in relation to specific pixels selected from said plurality of light-sensitive pixels.

3. The protective device of claim 1, wherein said modifier is adapted to modify said object image in relation to individual pixels selected from said plurality of light-sensitive pixels.

4. The protective device of claim 1, wherein said modifier is configured to displace said image sensor and said object image relative to each other in order to generate the modified object image.

5. The protective device of claim 4, wherein said image sensor is configured to be displaceable in terms of its physical position.

6. The protective device of claim 5, wherein said image recording unit comprises an optical axis, said image sensor being displaceable transversely with respect to said optical axis.

7. The protective device of claim 4, wherein said modifier is configured to displace said image sensor and said object image pixel by pixel with respect to each other.

8. The protective device of claim 1, wherein said image recording unit comprises recording optics having an optical path for the object image, said optical path being adapted to be varied by means of said modifier.

9. The protective device of claim 1, wherein said testing device comprises a light source for superimposing a variable optical signal on said object image.

10. The protective device of claim 9, wherein said light source is a laser light source.

11. The protective device of claim 9, wherein said light source illuminates an object area.

12. The protective device of claim 9, wherein said light source illuminates said image sensor.

13. The protective device of claim 1, wherein said testing device modifies the object image by means of a first and a second manipulation, the first and the second manipulation being different from each other and having a defined relationship to each other.

* * * * *